(12) United States Patent
Breslau et al.

(10) Patent No.: US 7,792,057 B2
(45) Date of Patent: Sep. 7, 2010

(54) METHOD AND SYSTEM FOR COMPUTING MULTICAST TRAFFIC MATRICES

(75) Inventors: Lee Breslau, Basking Ridge, NJ (US); William Fenner, Woodside, CA (US); Alexandre Gerber, Madison, NJ (US)

(73) Assignee: AT&T Labs, Inc., Austin, TX (US)

( * ) Notice: Subject to any disclaimer, the term of this patent is extended or adjusted under 35 U.S.C. 154(b) by 185 days.

(21) Appl. No.: 11/962,504

(22) Filed: Dec. 21, 2007

(65) Prior Publication Data

US 2009/0161673 A1 Jun. 25, 2009

(51) Int. Cl.
*H04L 12/28* (2006.01)
*H04H 20/71* (2008.01)
(52) U.S. Cl. .................. 370/254; 370/312; 370/395.32
(58) Field of Classification Search ........................ None
See application file for complete search history.

(56) References Cited

U.S. PATENT DOCUMENTS

| | | | |
|---|---|---|---|
| 6,405,251 B1 * | 6/2002 | Bullard et al. ............. | 709/224 |
| 6,714,513 B1 * | 3/2004 | Joiner et al. ................ | 370/224 |
| 6,785,240 B1 | 8/2004 | Cao et al. | |
| 7,002,960 B1 * | 2/2006 | Golan et al. ................ | 370/393 |
| 7,027,396 B1 | 4/2006 | Golan et al. | |
| 7,293,086 B1 | 11/2007 | Duffield et al. | |
| 2006/0253607 A1 | 11/2006 | Schollmeier et al. | |
| 2007/0005792 A1 * | 1/2007 | Collet et al. ................ | 709/231 |
| 2007/0141048 A1 | 6/2007 | Rabinovitch et al. | |

\* cited by examiner

*Primary Examiner*—Chirag G Shah
*Assistant Examiner*—Jenkey Van
(74) *Attorney, Agent, or Firm*—Fay Kaplun & Marcin, LLP

(57) ABSTRACT

A system and method for receiving, from one or more ingress routers, a first set of records including data corresponding to network traffic, receiving, from one or more egress routers, a second set of records including data corresponding to network traffic and creating a multicast traffic matrix using at least a portion of the data included in the first and second sets of records.

13 Claims, 2 Drawing Sheets

US 7,792,057 B2

METHOD AND SYSTEM FOR COMPUTING MULTICAST TRAFFIC MATRICES

BACKGROUND

The use of IP multicast is an increasingly common method of Internet data transmission. Through IP multicast transmission, such applications as audio and videoconferencing, broad software distribution, multimedia broadcasts and dissemination of financial market data can be accomplished more easily than through an IP unicast.

Because of the increasing use of IP multicast, it is desirable to trace and record the distribution of data packets to multicast groups. One common format for recording this type of data is in a multicast traffic matrix. A multicast traffic matrix can be used to easily summarize such data. Generation of such a matrix, however, presents computation and scaling difficulties.

SUMMARY OF THE INVENTION

A method for receiving, from one or more ingress routers, a first set of records including data corresponding to network traffic, receiving, from one or more egress routers, a second set of records including data corresponding to network traffic and creating a multicast traffic matrix using at least a portion of the data included in the first and second sets of records.

A system having a plurality of routers including ingress routers and egress routers and a network management station receiving, from one or more of the ingress routers, a first set of records including data corresponding to network traffic; receiving, from one or more of the egress routers, a second set of records including data corresponding to network traffic and creating a multicast traffic matrix using at least a portion of the data included in the first and second sets of records.

DETAILED DESCRIPTION

Figure 1:
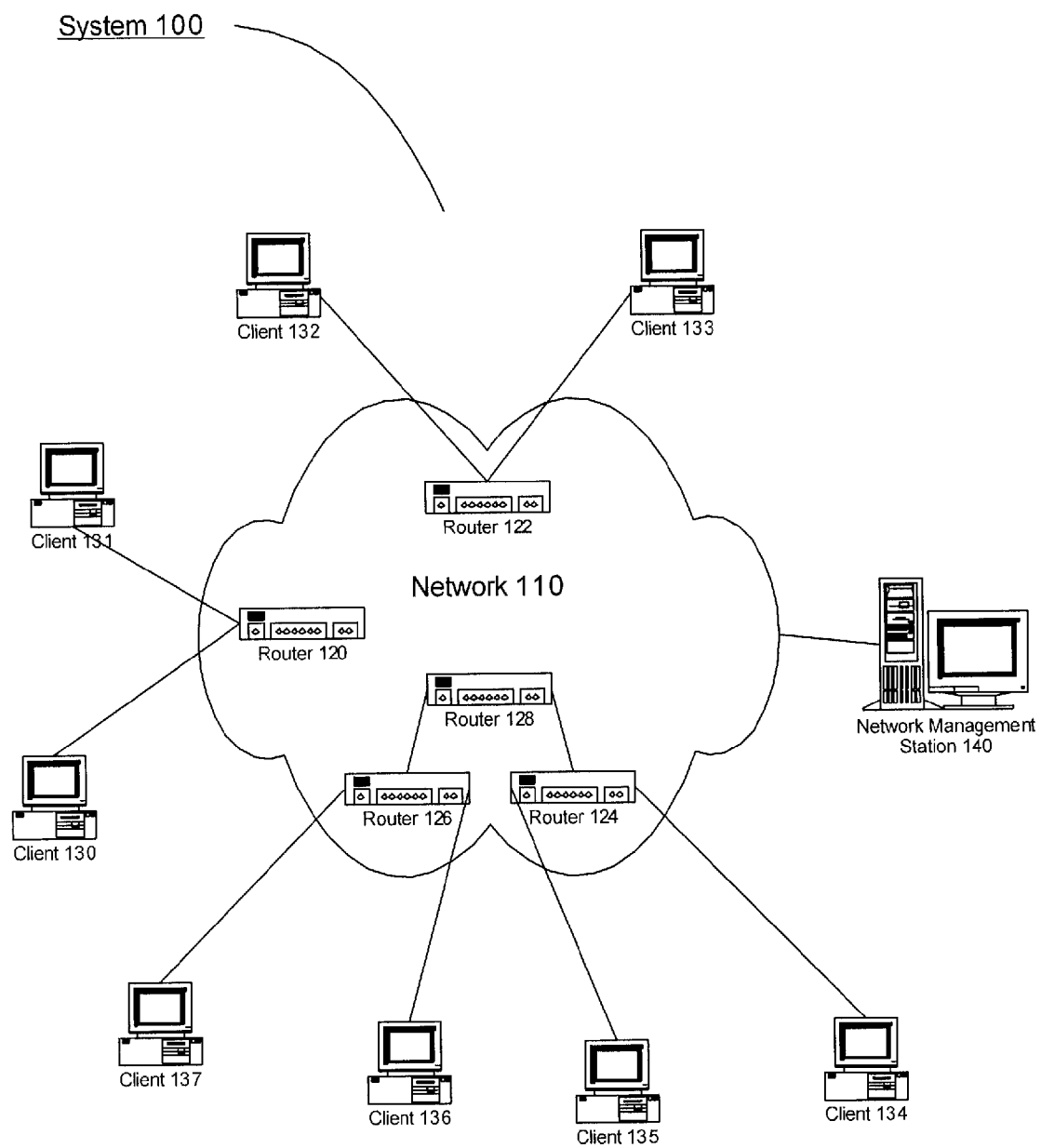
FIG. 1 shows an exemplary system according to the present invention.

The exemplary embodiments of the present invention may be further understood with reference to the following description and the appended drawings, wherein like elements are referred to with the same reference numerals. The exemplary embodiments of the present invention describe a method and system for computing multicast traffic matrices. The exemplary embodiments provide for the computation of these matrices in a manner that limits the locations where data collection takes place, thus providing for scalability to large networks. The exemplary system and method will be discussed in detail below.

A traffic matrix contains information about the traffic transported over a network. It may describe multiple parameters of network traffic, including the routers at which traffic entered or exited the network, the customer who sent or received the traffic, the application that generated the traffic, the volume of the traffic, etc. The matrix may be expressed in terms of a number of bytes or a number of packets, and will pertain to a particular time interval (e.g., 5 minutes, 1 hour, 1 day, etc.) that is selected to be useful to the entity that is generating the matrix. Computation of a traffic matrix for a large, high-speed network presents challenging scaling issues. For example, it may involve collecting a large amount of data from a large number of network elements, storing the data, and performing complex computations using the data.

Knowledge of a traffic matrix is a network management function that has multiple uses. For example, an understanding of the amount of traffic entering and exiting a network may be important for network engineering and provisioning; this knowledge makes it possible to run simulations that predict the utilization of various links within the network if the network topology changes (e.g., if one or more links become unavailable, etc.). Additionally, a traffic matrix may be useful for identifying anomalies (e.g., short term spikes) in network traffic, which may indicate that a security attack on a network is taking place. Finally, knowing how much traffic a customer transmits to or receives from the network can be used as input into a billing function.

The most common type of IP broadcasting is known as unicast, which may be thought of as point-to-point data transport. When unicast transport of data takes places, a packet originates at an IP host and is addressed to a single destination IP host. The packet is then delivered to the destination using standard network routing methods. The problem of computing or estimating traffic matrices for unicast traffic has been studied, and solutions have been developed and deployed in various types of networks.

In contrast to standard unicast network transportation of data, IP multicast transport transmits a packet from a source host to one or more destination hosts. Such a packet will contain a multicast group address (stored in a special portion of the 32-bit IP address space) in the destination field of the IP header. Hosts that wish to receive packets addressed to a given multicast group express this interest via a group membership protocol, e.g., the Internet Group Membership Protocol ("IGMP"). A multicast routing protocol delivers a multicast packet from the source host to destination hosts that have joined a particular multicast group. This is accomplished by forming a distribution tree within the network. Such a tree has the single source as the root of the tree and the multiple receivers as its leaves. The packet is forwarded along the edges of the tree and is replicated at its branching points. In this manner, no more than one copy of the packet is forwarded along each link in the network, and each interested destination host receives one copy of the packet.

IP multicast is used to support such applications as audio and video conferencing, mass software distribution, multimedia broadcasts, dissemination of financial market data, and VPN service between customer sites in service provider networks. Because these manners of transmission are all becoming more common, the use of IP multicast is increasing accordingly. Given the increasing use and importance of multicast traffic, as well as its fundamental differences from unicast traffic, it is important for network providers to be able to generate and use multicast traffic matrices.

The exemplary embodiments of the present invention, therefore, provide methods and systems for computing multicast traffic matrices that are both efficient and scalable. FIG. 1 shows an exemplary system 100 according to the present invention. The exemplary system 100 may act in accordance with the exemplary method 200, shown in FIG. 2. The system 100 includes a network 110, which may be, for example, the Internet or the backbone of a large-scale enterprise network. The network 110 includes a plurality of routers 120, 122, 124, 126, 128. Those of skill in the art will understand that while FIG. 1 illustrates a network 110 that includes five routers, the precise number of routers will vary for each implementation of the network 110. All "edge routers" (i.e., routers that route traffic clients, as opposed to those that route traffic solely to other network components) have Netflow enabled. In the exemplary network 110, routers 120, 122, 124 and 126 are edge routers; router 128 is not. The use of Netflow will be described below. (In another exemplary embodiment of the present invention, rather than enabling Netflow on edge routers, Netflow is enabled on aggregating routers. Referring again to FIG. 1, this means Netflow would be enabled on router 128 but not on routers 124 and 126.) Each of the routers 120, 122, 124, 126 provides network access for one or more clients 130-137. As above, those of skill in the art will understand that the precise number of clients will vary for each implementation of the network 110. The network may also include a network management station 140, which may be where the exemplary method 200 is performed.

Figure 2:
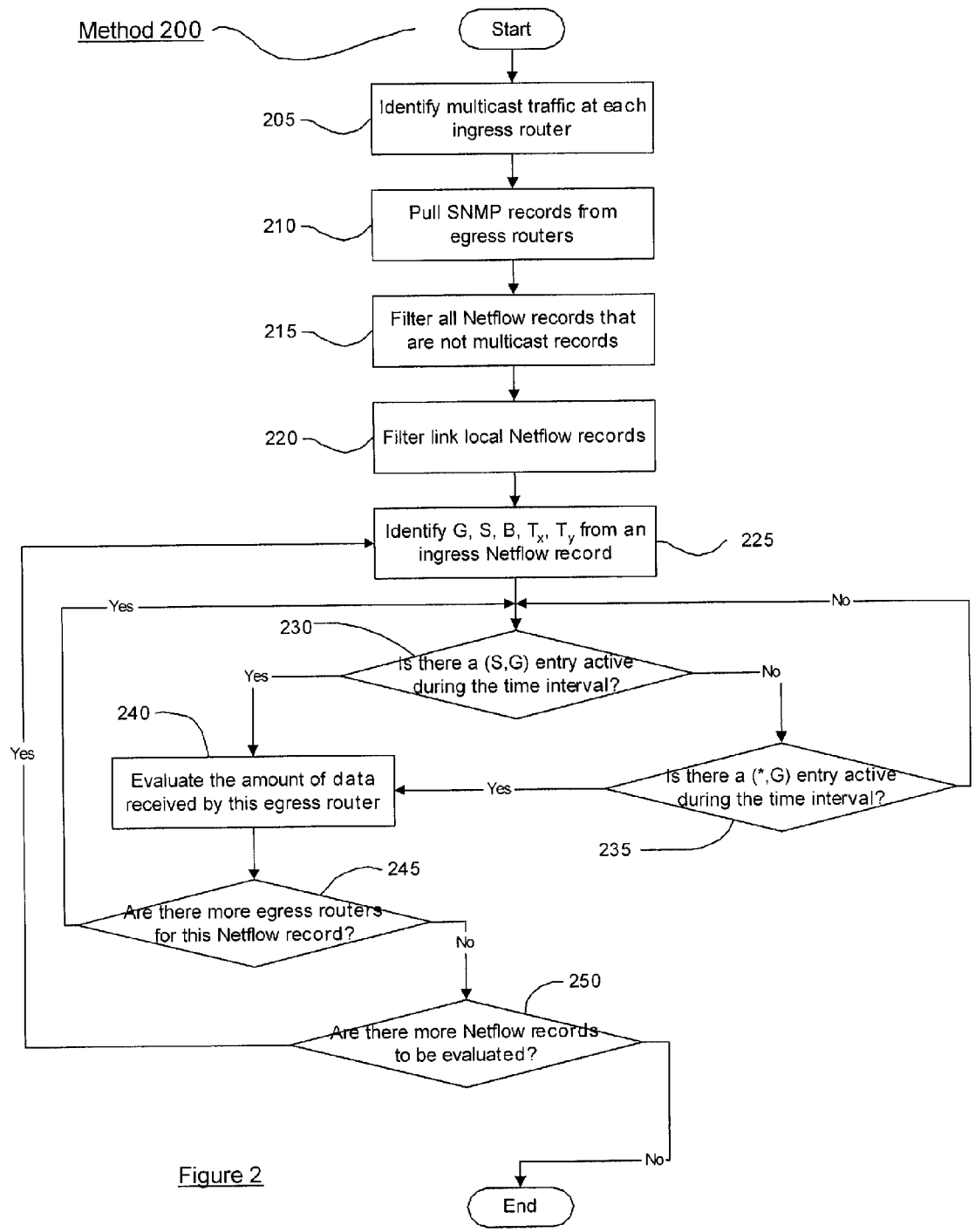
FIG. 2 shows an exemplary method for generating a multicast traffic matrix according to the present invention.

FIG. 2 shows an exemplary method 200 for generating multicast network traffic matrices. The exemplary method 200 comprises three main phases. In step 205, traffic sent by each source to each multicast group at each ingress router is identified. In step 210, for each multicast group, the set of egress routers at which traffic addressed to that group exits the network is identified. In the third phase, which comprises steps 215 through 250, the ingress data is merged with the egress data to compute a multicast traffic matrix. Each of these phases will be described in detail below.

Step 205 involves the identification of multicast traffic by group, source host, and ingress router. This is accomplished using Netflow records. Netflow is a function available on commercial routers and provides traffic reports about groups of packets. A Netflow record contains information about all packets that match the same key and were sent or received by a router during a particular time interval. The key for a Netflow record includes the source and destination IP addresses of the packet, the higher layer protocol used (i.e., TCP or UDP), the source and destination port numbers (if relevant to the higher layer protocol), and the incoming/outgoing interfaces on the router traversed by the packets. For example, all packets belonging to a TCP connection will be included in the same Netflow record. The information contained in a Netflow record includes the number of packets covered by the record, the total number of bytes in those packets, the time the first packet was received, and the time the last packet was received. Netflow uses a "push" model of data collection. This means that all Netflow records produced at a router are exported to a designated Netflow collector.

Multicast packets will contain a multicast group address. Multicast group addresses are within the IP address range between 224.0.0.0 and 239.255.255.255. Therefore, among all Netflow records, those that pertain to multicast packets can easily be identified by the value of the destination IP address in the key of the Netflow record.

As described above, Netflow is enabled on edge routers 120, 122, 124, 126 in the network 110. (As mentioned above, in other exemplary embodiments of the present invention, Netflow can be enabled at aggregating routers rather than at edge routers; this can result in reducing the overhead involved in data collection.) Incoming multicast traffic is identified by the destination address in the IP header and by the incoming/outgoing interfaces in the network records. That is, based on the interfaces, it may be determined whether the Netflow record pertains to traffic entering or exiting the network. Using information contained in the Netflow records and configuration information about the network topology, it is possible to identify the ingress router at which multicast traffic has entered the network.

In step 210, multicast traffic is then identified by group and egress router. Each multicast packet will exit the network at one or more egress routers. Netflow records may be enabled at the egress interfaces of all edge routers to collect this information. However, collecting Netflow records at all egress routers (potentially a large number) presents a challenging scalability problem.

Instead, step 210 utilizes a network management protocol called Simple Network Management Protocol (hereinafter "SNMP"). SNMP provides network management information about a router. Rather than using a push model as described above for step 225, SNMP uses a "pull" model: a network management station queries a remote router for one or more defined network management items.

SNMP defines a large amount of network management information that may be obtained from network routers. This information includes information about the multicast routing table at a router. Specifically, in response to an SNMP query, a router may provide the set of multicast routing table entries active at the router. Each routing table entry specifies a multicast group (hereinafter "G") and a source address (hereinafter "S"). A wildcard may be used in place of the source address; this indicates that the routing table entry pertains to all sources.

The presence of a multicast routing table entry, designated by an ordered pair (S,G), indicates that the router will receive packets sent by source S and addressed to group G. The existence of a routing table entry with a wildcard source entry, (*,G), indicates that the router will receive all packets addressed to group G sent by any source other than those for which a specific (S,G) entry exists at the router. Thus, SNMP polling provides a way to determine which routers will receive packets destined to which groups at a given point in time. To accomplish this, in step 210, SNMP is periodically used to poll all edge routers for the contents of their multicast routing tables.

Each SNMP polling cycle determines which groups are active at a router at time T. This information is then translated into intervals during which a router was receiving packets destined for a particular group. Consider a series of SNMP polls at a router, $P_i$, each occurring at a specific time, $T_i$. If a multicast routing table entry (S,G) was active at the router for all consecutive polls from $P_j$ to $P_k$, where $j \leq k$, and (S,G) was not active at the router in poll $P_{j-1}$, or in poll $P_{k+1}$, then a record is created indicating that the entry (S,G) was active from time $T_j$ to time $T_k$.

As discussed above, the third phase of the exemplary method spans steps 215-250 and occurs once source data has been retrieved from the routers within the network in steps 205 and 210. In step 215, all Netflow records not destined to a multicast group are filtered from consideration. As discussed above, this means removing all Netflow records other than those with destination IP addresses in the range between 224.0.0.0 and 239.255.255.255. In step 220, Netflow records addressed to multicast group addresses 224.0.0.0/24 are also removed consideration, since those addresses are designated as link local and are not forwarded over the network.

In step 225, for each remaining Netflow record, the ingress router, the group G, the source S, the number of bytes ("B"), the start time $T_x$, and the stop time $T_y$ are identified. In step 230, for one of the plurality of possible egress routers, the SNMP-derived records are examined to see if there is a record for (S,G) active during the time interval $(T_x,T_y)$. An SNMP record with an active interval $(T_i,T_j)$ is active during a Netflow record active during $(T_x,T_y)$ if $T_i \leq T_y$ and $T_j \geq T_x$.

If it is determined that the individual SNMP record (S,G) being considered is not active during the time interval $(T_x,T_y)$, the method proceeds to step 235; if active, to step 240. In step 235, it is determined whether there is a wildcard SNMP record of the form (*,G) active during the same Netflow record. If so, the method also proceeds to step 240; if not, back to step 230, where the next egress router is evaluated.

If an SNMP-derived record from an egress router, either a specific (S,G) record or a wildcard (*,G) record, has been determined to have been active during the time interval of a Netflow-based record from an ingress router (i.e. during steps 230 or 235), then the count of bytes indicated in the Netflow record must be included in the count of bytes received at the egress router for group G. Step 240 determines the number of bytes to be so included. If the SNMP-derived record covers the entire interval of the Netflow record (i.e., if $T_i \leq T_x$ and $T_j \geq T_y$) then all of the bytes in the Netflow record are noted as having been received at the egress router. If this is not the case (i.e., if the SNMP-derived record does not cover the entire interval of the Netflow record), then linear interpolation is used to allocate a percentage of the bytes as having been received at the egress router. This percentage may be calculated as:

$$\frac{\min(Tj, Ty) - \max(Ti, Tx)}{Ty - Tx}$$

The actual number of bytes assigned to the egress router is then obtained by multiplying the above percentage by the number of bytes B for the Netflow record being considered.

After some or all of the byte total from the Netflow record has been included in step 240, in step 245 it is determined whether there are additional egress routers that must be processed for the current Netflow record. If so, the method returns to step 230, where evaluation begins for the next egress router. If not, the method continues to step 250, where it is determined whether there are additional Netflow records to consider. If so, the method returns to step 225, where evaluation of the next Netflow record begins. If there are no more Netflow records to evaluate, then the method terminates after step 250.

Once processing is completed under the exemplary method 200, the resulting byte counts for various multicast groups at various egress routers may be combined to form a traffic matrix in any manner in which a user of the network management station 140 sees fit.

The exemplary embodiments of the present invention provide a system and method for generating multicast network traffic matrices. Additionally, the exemplary method does so in a manner that is efficient and scalable to large enterprise networks.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving, from one or more ingress routers, a first set of records including data corresponding to network traffic;
   receiving, from one or more egress routers, a second set of records including data corresponding to network traffic;
   creating a multicast traffic matrix using at least a portion of the data included in the first and second sets of records, wherein creating the multicast traffic matrix comprises removing, from the first set of records, records of network traffic not sent to multicast groups;
   determining multicast group information for a first record of the first set of records;
   determining if a second record of the second set of records includes corresponding multicast group information;
   determining, if the first and second records have corresponding multicast group information, whether a first time interval of the first record overlaps a second time interval of the second record;
   determining, if the first time interval overlaps the second time interval, a value based on the overlap; and
   allocating an amount of traffic in the second record to a multicast group corresponding to the multicast group information based on the value.

2. The method of claim 1, wherein the creating further comprises:
   removing, from the first set of records, records of network traffic sent to link local addresses.

3. The method of claim 1, wherein the removing is based on a network address included in the records.

4. The method of claim 1, wherein the value is determined based on a time of the overlap of the first and second time intervals and a time of the first time interval.

5. The method of claim 1, wherein the first set of records is a set of Netflow records.

6. The method of claim 1, wherein the second set of records is retrieved using a Simple Network Management Protocol.

7. The method of claim 1, wherein the ingress routers are edge routers.

8. The method of claim 1, wherein the ingress routers are aggregating routers.

9. A system, comprising:
   a plurality of routers including ingress routers and egress routers; and
   a network management station receiving, from one or more of the ingress routers, a first set of records including data corresponding to network traffic; receiving, from one or more of the egress routers, a second set of records including data corresponding to network traffic; and creating a multicast traffic matrix using at least a portion of the data included in the first and second sets of records, wherein the creating comprises removing, from the first set of records, records of network traffic not sent to multicast groups, determining multicast group information of a first record of the first set of records, determining if a second record of the second set of records includes corresponding multicast group information, determining, if the first and second records have corresponding multicast group information, whether a first time interval of the first record overlaps a second time interval of the second record, determining, if the first time interval overlaps the second time interval, a value based on the overlap, and allocating an amount of traffic in the second record to a multicast group corresponding to the multicast group information based on the value.

10. The system of claim 9, wherein the creating further comprises:
    removing, from the first set of records, records of network traffic sent to link local addresses.

11. The system of claim 9, wherein the first set of records is a set of Netflow records.

12. The system of claim 9, wherein the second set of records is retrieved using the SNMP protocol.

13. A non-transitory computer readable storage medium including a set of instructions executable by a processor, the set of instructions operable to:
    receive, from one or more ingress routers, a first set of records including data corresponding to network traffic;
    receive, from one or more egress routers, a second set of records including data corresponding to network traffic;
    create a multicast traffic matrix using at least a portion of the data included in the first and second sets of records, wherein creating the multicast traffic matrix comprises removing, from the first set of records, records of network traffic not sent to multicast groups;

determine multicast group information for a first record of the first set of records;

determine if a second record of the second set of records includes corresponding multicast group information;

determine, if the first and second records have corresponding multicast group information, whether a first time interval of the first record overlaps a second time interval of the second record;

determine, if the first time interval overlaps the second time interval, a value based on the overlap;

allocate an amount of traffic in the second record to a multicast group corresponding to the multicast group information based on the value.

* * * * *